Patented Nov. 29, 1927.

1,651,027

UNITED STATES PATENT OFFICE.

ARTHUR W. HIXSON, OF LEONIA, NEW JERSEY, AND ARNOLD K. BALLS, OF PHILADELPHIA, PENNSYLVANIA, ASSIGNORS, BY DIRECT AND MESNE ASSIGNMENTS, TO THE FLEISCHMANN COMPANY, OF NEW YORK, N. Y., A CORPORATION OF OHIO.

METHOD OF INCREASING THE ACTIVITY OF YEAST AND ACTIVATOR FOR YEAST.

No Drawing.   Application filed December 12, 1922. Serial No. 606,521.

This invention relates to methods of improving yeast, and increasing the activity thereof, and to activators for yeast.

In the manufacture of bread with yeast, the texture and lightness of the loaf, as well as much flavor, arises from the action of various ferments of the yeast upon other constituents of the dough. It is principally the carbohydrates, though certain amino acid groups of the flour proteins are also acted upon, which furnish the substrates for these enzymes. Since yeast grows little or not at all, according to our observations, during the process of bread making, the quantity of ferments available is limited to the producing capacity of the cells added at the start of the process, and therefore a consideration of the function of the yeast in bread making becomes a consideration of the enzymic reactions of fermentation.

Several enzymes are known to take part in the reactions which occur in raising sponge or dough; and from this standpoint, their chief end-product is carbon dioxide. The formation of carbon dioxide in bread is largely the result of the action of zymase or alcoholase together with its co-enzyme, a substance of unknown constitution. This enzyme or group of enzymes produces carbon dioxide from a monosaccharide, probably an enolic form of glucose. This monosaccharide may be derived from the cane sugar added to the dough, or from carbohydrates of the flour, by the action of separate enzymes appropriately hydrolyzing these substrates. At least one of these enzymes, namely invertase, is extracellular, that is, can be found in the liquid surrounding the living cell, in distinction to zymase, for instance, which exists only inside the living cell, and cannot be separated therefrom, at least uncombined with substrate, without first destroying the organization of the cell itself. The enzymes of yeast are typical catalysists, in that their effects, if continued over an indefinitely long time, are not proportional to the amount of enzyme, but are almost as great with a little as with much. On the other hand, the amount of reaction performed in a definite time, especially if this time be short, can be shown by proper mathematical expression of the same laws of catalysis to vary much with the quantity of enzyme present.

In the manufacture of bread, time gained is commercially valuable in increasing the turnover of a given unit of plant, while in long continued fermentation of doughs, extraneous infections, ruinous to the product, are much more apt to develop. It is, therefore, of great commercial importance to obtain from the yeast used in fermenting dough as much of the fermenting enzymes at the beginning as possible, thereby either to greatly shorten the time required to make bread, or to increase the output of carbon dioxide per unit, consequently increasing the size of the loaves.

We have found that the increase of enzyme output from the yeast used in baking does not, to secure a good product, need necessarily to include an increase in the output of invertase and the other ferments whose functions are to prepare the carbohydrates for the action of the zymase. These "preparative ferments" are present in nearly all yeast in quantities ample to hydrolyze the small amounts of carbohydrate necessary, and being, in part at least, extracellular, do not require any particular treatment to render them readily available. This, however, is not true of the zymase which either because of the localization of its action within the cell, or of its smaller proportions, or of its lower catalytic power, causes the reactions dependent upon it to proceed at the slowest rate of any of the changes immediately concerned with the process of bread making. To produce the effect desired of hastening the enzymic action of the yeast, it is necessary to give attention especially to the mode of action of this particular ferment.

The available "zymase effect" then, depends first upon the permeability of the yeast cell. It is known that increasing the permeability of the cell wall allows a greater ferment action, but whether this be due to the extrusion of the enzyme in the presence of its substrate, or to the instrusion of the substrate into the cell, is not known definitely. Secondly, however, it is known that in the yeast cell an enzyme exists inimical to zymase, and which has been called yeast endo-tryptase. This enzyme is present in the juice of the yeast prepared by the method of Büchner, and is a protease similar to the trypsin of the human body. It combines with zymase in a manner unknown, and destroys the activity of the latter.

In pursuance of the above theoretical considerations, we have made the deduction that these principles can be applied to bread undergoing the process of fermentation or "raising", that is, to the use of live baking yeast as well as to the yeast juice and dead yeast preparations with which they have been previously demonstrated by other investigators. We have observed that yeast with great proteolytic activity also produces many undesirable results in bread. By disrupting the flour proteins, the dough is made sticky and hard to handle. It becomes more liquid, and makes loaves of undesirable flat and flabby shape. The bread resulting is impaired in taste and texture, contains larger pores, due to coalescence of the gas bubbles in the semiliquid dough, and forms smaller loaves, due to actual loss of gas by bubbling from the surface of the batch. Extensive proteolysis produces a further harmful effect in that the protein particles, colloidal in nature, lose considerable of their normal ability to adsorb carbon dioxide, if they are partially digested. When adsorbed, the gas is held under presumably great pressure and greatly diminished volume at the surface of these particles. When the dough is placed in the oven, the gas, less adsorbed at higher temperatures, is suddenly released, rapidly expanding the dough in the oven, and producing a very uniform texture. The so-called "oven spring" of the loaf, due of course in part to the normal expansion of gas already present at atmospheric pressure, is greatly enhanced by this sudden liberation of adsorbed gases as described. This is very important practically, because doughs possessing much oven spring are greatly desired by bakers.

In our process to obtain the maximum effect of zymase from the given quantity of yeast added, in a definite amount of time, preferably the short time of a few hours, the most favorable procedure is to combat both inimical conditions, namely the impermeability of the cells and the proteolytic effect. The farther desirable effect is then produced that the actual quantity of gas evolved from the sugar is more efficiently utilized, by reason of its coming into action largely at the most propitious time, that is, contributing to the "oven spring", meanwhile the dough having been spared the other harmful effects of excessive proteolysis.

In investigating the applicability of these deductions, we have found that substances of an admittedly anti-tryptic nature, when placed in contact with yeast, either in such a way as to pretreat the yeast before putting it into the sponge or dough, or by adding the substance directly to the dough, or to a sponge when first prepared, or when being made into a dough, greatly increase the size and desirability of the loaf. Such a substance is for instance, a fresh and anti-tryptic blood serum, or a preparation of the globulin proteins from serum.

We have found that substances known to increase the permeability of cells, such as the various saponins, also greatly increase the size and desirability of the loaf when used as outlined above.

We have found also that a certain class of substances which can be permissibly and honorably added to foodstuffs, has the power of both inhibiting the action of yeast endotryptase and of increasing cell permeability. This class of substances is the series of aliphatic organic acids, generally termed the fatty acids, having a straight chain structure. The members of this series most effective are those having at least six carbon atoms. This class of substances is herein also defined to include both saturated and unsaturated fatty acids, and their salts of the non-toxic metals, such as potassium, lithium, sodium, calcium, and the like, as well as their derivatives, obtained by reduction or esterification, or halogenation, and any other reasonably related substances. The properties pertaining to this invention are not possessed solely by any single substance to the exclusion of the others, but are properties residing, as shown by wide experimentation, in aliphatic compounds of the class and configuration herein specified.

The best method of applying these substances is to use them in the form of compounds soluble in water, for which purpose the sodium or potassium salts, or soaps, of the fatty acids are well suited; although the quantity needed is so small that even those compounds generally regarded as insoluble are sufficiently dissolved in the liquid to produce desirable effects, provided only adequate mixing takes place.

It is also convenient to use these materials in combination with some inert substance such as flour, which making a known proportion of the preparation, facilitates weighing out the otherwise small quantities required. Calcium sulphate may also be used as a diluent of the material with a slightly helpful effect, but is not necessary.

The proportions in which these substances can be used may vary very widely without producing any bad effects, but those best adapted for their use lie between approximately .00000067 gram molecule of the active principle per gram of ordinary compressed yeast, containing as it does about 70 per cent of water, as a lower limit; and approximately .00004 gram molecule of active substance per gram of compressed yeast as an upper limit, with an optimum quantity of about .0000033 gram molecule per gram of yeast.

The substances of this invention can be added to water and the yeast stirred into this mixture at temperatures which may vary between 10° and 30° C., but preferably about 20° C., for period of 18 hours or less, for example a period of from 14 to 16 hours. Sugar, malt extract, and the like known substances are added with advantage to this pretreatment mixture, and when the treatment is completed, the dough or sponge can be made with the yeast so prepared by any of the known and usual methods.

If desired, the substances can be used with the yeast directly in preparing a "straight dough" or included in an ordinary "sponge" method of baking, or also inserted at the time of making the sponge into the dough. It is not desired to limit the invention to any particular method of bread making, type of apparatus, or of bread, as wherever yeast is used in preparing cereal foodstuffs, this invention causes noteworthy improvements. Bread made in this way is in larger loaves, of better texture and flavor, and in the case of white bread, of a superior color.

The material of this invention gives very favorable results when applied to yeasts that are either weak or that ordinarily are slow in working; in this way, it is possible to use the known methods of straight doughs and short sponges with yeasts otherwise unfit; particularly dried or otherwise preserved yeasts. This is a great advantage of the invention.

In a typical embodiment of our invention, 4 grams of a dried yeast or 12 grams of a compressed yeast are treated with 15 milligrams of the sodium salt of stearic acid in 100 cc. of water containing 2 grams of malt extract (dry weight) for 16 hours with stirring at room temperature. This yeast is then used to prepare a loaf of bread containing 400 grams of flour and the other known and necessary ingredients in a sponge or a straight dough fermentation. The loaf so produced is about 25 per cent greater in cubic capacity than that obtained from the same yeast and method without the use of sodium stearate. Potassium and lithium stearate, and salts of oleic, linoleic, lauric, palmitic, and of the like acids, salts of brom stearic acid, and of brominated fatty acids of fish oils, and other substances of this class, or mixtures of these can be substituted for the sodium stearate in approximately the same relation to the weight of yeast used, with the same results, due regard being paid as previously disclosed, to their respective molecular weights.

While we have described in detail the preferred practice of our process, it is to be understood that the details of procedure, and proportion of ingredients may be widely varied, and that known chemical equivalents may be employed in place of the materials mentioned, without departing from the spirit of the invention or the scope of the subjoined claims.

Having thus described our invention, we claim:—

1. A method of increasing the zymase activity of yeast for improving bread made therewith, which comprises subjecting yeast or a mixture containing yeast to the action of a tripsin inhibitor in such amounts and for such a time as effectually to suppress the endo-triptase activity of the yeast.

2. A method of increasing the zymase activity of yeast for improving bread made therewith, which comprises subjecting yeast or a mixture containing yeast to the action of a non-toxic fatty acid substance containing more than six carbon atoms in the molecule, in such amounts and for such a time as effectually to suppress the endo-triptase activity of the yeast.

3. A method of increasing the zymase activity of yeast for improving bread made therewith, which comprises subjecting yeast or a mixture containing yeast to the action or a tripsin inhibitor in such amounts and for such a time as effectually to suppress the endo-triptase activity of the yeast, and to increase the permeability of the cell walls as described.

4. A method of increasing the zymase activity of yeast for improving bread made therewith, which comprises subjecting yeast or a mixture containing yeast to the action of a halogenated derivative of an aliphatic organic acid, in such amounts and for such a time as effectually to suppress the endo-triptase activity of the yeast.

5. A method of treating yeast prior to incorporating it in a dough batch, which comprises subjecting the yeast to the action of a non-toxic derivative of a fatty acid in the proportion of from .00000067 and .00004 gram molecules per gram of yeast.

6. A method of treating yeast prior to incorporating it in the dough batch, which comprises subjecting the yeast to the action of a non-toxic fatty acid substance in the proportion of about 0.0000033 gram molecule per gram of yeast.

In testimony whereof, we affix our signatures.

ARTHUR W. HIXSON.
ARNOLD K. BALLS.